Dec. 4, 1928.
D. MACRIPO
MEAT CUTTING BOARD
Filed May 23, 1927
1,693,761
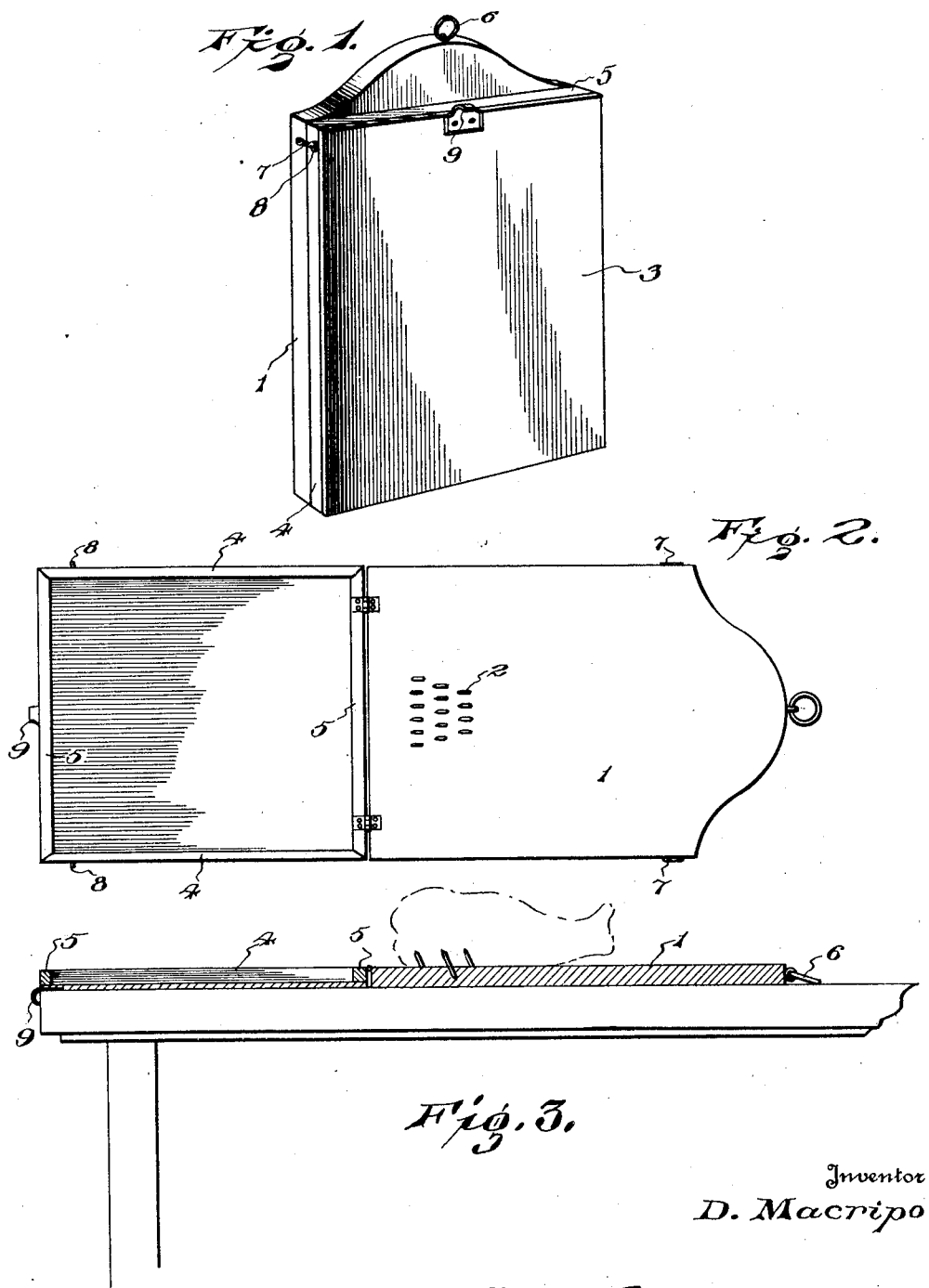

Patented Dec. 4, 1928.

1,693,761

UNITED STATES PATENT OFFICE.

DOMENIC MACRIPO, OF HAZLETON, PENNSYLVANIA.

MEAT-CUTTING BOARD.

Application filed May 23, 1927. Serial No. 193,665.

The present invention is directed to improvements in meat cutting boards.

The primary object of the invention is to provide a board of this character so constructed that a piece of meat to be cut may be firmly held against slipping during the cutting thereof.

Another object of the invention is to provide a board of this nature which can be placed upon a table or the like and held against slipping.

Another object of the invention is to provide a board of this kind having associated therewith a cover adapted to protect the cutting surface of the board against contamination when the device is not in use.

In the accompanying drawing,

Figure 1 is a perspective view of the device showing the same in inoperative position.

Figure 2 is a top plan view of the devcie in its operative position.

Figure 3 is a longitudinal sectional view through the same.

Referring to the drawing, 1 designates the cutting board and upon which is secured a plurality of pointed pins 2 and upon which the meat being cut is impaled. The pins are inclined forwardly and arranged in a group near one end of the board.

Hingedly connected to the board 1 adjacent the end bearing the pins 2 is a cover 3 which is provided with side and end flanges 4 and 5, respectively, which are of such height that when the cover is folded upon the board 1, as shown in Figure 1, the pins 2 will be confined and the cutting surface of the board protected against dust, and insects.

The board has secured to its free end a ring 6 in order that the device can be conveniently suspended when not in use, there being hooks 7 carried by the board for engaging the eyes 8 of the cover to hold the same firmly closed.

The cover is provided with a centrally located hook 9 adapted to engage the edge of a table to prevent the board from slipping when meat is being cut thereon.

Since the pins 2 are inclined a piece of meat impaled thereon will be firmly held while being cut.

While I have described the board as being more particularly designed for cutting meat, it will be of course understood that fish or other articles of food may be cut thereon equally as well.

The cover when unfolded will lie in a plane with the board and constitutes a tray for receiving the sliced material.

Having thus described the invention, I claim:

A device of the class described comprising a board, a plurality of pins carried thereby, a cover hingedly connected to the board for confining the pins and protecting the cutting surface of the board when folded thereon, said cover serving as a tray to receive slices when the board is in its operative position.

In testimony whereof I affix my signature.

DOMENIC MACRIPO. [L. S.]